(12) United States Patent
Brower

(10) Patent No.: US 10,998,686 B2
(45) Date of Patent: *May 4, 2021

(54) ELECTRICAL OUTLET WITH INTERCHANGEABLE FACEPLATE MODULES

(71) Applicant: HUBBELL INCORPORATED, Shelton, CT (US)

(72) Inventor: John Brower, Fairfield, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/819,249

(22) Filed: Mar. 16, 2020

(65) Prior Publication Data

US 2020/0244022 A1 Jul. 30, 2020

Related U.S. Application Data

(63) Continuation of application No. 16/002,925, filed on Jun. 7, 2018, now Pat. No. 10,594,101.
(Continued)

(51) Int. Cl.
*H01R 13/447* (2006.01)
*H01R 31/06* (2006.01)
(Continued)

(52) U.S. Cl.
CPC ....... *H01R 31/065* (2013.01); *H01R 12/7076* (2013.01); *H01R 12/7082* (2013.01); *H01R 12/712* (2013.01); *H01R 13/6691* (2013.01); *H01R 13/701* (2013.01); *H02J 7/0042* (2013.01); *H02J 7/0047* (2013.01); *H02J 7/025* (2013.01); *H02J 50/10* (2016.02); *H01R 13/447* (2013.01); *H01R 13/7175* (2013.01);
(Continued)

(58) Field of Classification Search
CPC .. H01R 31/065; H01R 13/447; H01R 25/006; H01R 24/76; H01R 27/02; H02G 3/14; H02G 3/18
See application file for complete search history.

(56) References Cited

U.S. PATENT DOCUMENTS 3,609,647 A 9/1971 Castellano
5,898,130 A 4/1999 Tansi et al.
(Continued)

FOREIGN PATENT DOCUMENTS

CN 101076927 11/2007
CN 202977851 6/2013
CN 105655793 6/2016

OTHER PUBLICATIONS

Chinese Patent Application No. 201880039843.9 First Office Action issued by the China National Intellectual Property Administration and translation, dated Sep. 3, 2020.

*Primary Examiner* — Tho D Ta
(74) *Attorney, Agent, or Firm* — Michael Best & Friedrich, LLP

(57) ABSTRACT

An electrical outlet assembly includes a sub-faceplate having a front surface and first set of contacts position on the front surface. An outer faceplate includes an outer surface and an inner surface, the inner surface having a second set of contacts. The outer faceplate is releasably connected to the sub-faceplate so that the first set of contacts connect to the second set of contacts.

18 Claims, 4 Drawing Sheets

Related U.S. Application Data

(60) Provisional application No. 62/516,932, filed on Jun. 8, 2017.

(51) Int. Cl.

| | | |
|---|---|---|
| *H01R 12/70* | (2011.01) | |
| *H01R 13/70* | (2006.01) | |
| *H02J 50/10* | (2016.01) | |
| *H02J 7/00* | (2006.01) | |
| *H02J 7/02* | (2016.01) | |
| *H01R 13/66* | (2006.01) | |
| *H01R 12/71* | (2011.01) | |
| *H01R 13/717* | (2006.01) | |
| *H01R 25/00* | (2006.01) | |
| *H01R 27/02* | (2006.01) | |
| *H02G 3/18* | (2006.01) | |
| *H01R 24/76* | (2011.01) | |
| *H02G 3/14* | (2006.01) | |

(52) U.S. Cl.
CPC ............ *H01R 24/76* (2013.01); *H01R 25/006* (2013.01); *H01R 27/02* (2013.01); *H02G 3/14* (2013.01); *H02G 3/18* (2013.01); *H02J 7/00* (2013.01)

(56) References Cited

U.S. PATENT DOCUMENTS

| | | | |
|---|---|---|---|
| 6,050,849 | A | 4/2000 | Chang |
| 6,366,671 | B1 * | 4/2002 | Beavers ............... H01R 25/006 379/438 |
| 7,367,121 | B1 | 5/2008 | Gorman |
| 8,542,819 | B2 | 9/2013 | Hazani |
| 8,658,893 | B1 * | 2/2014 | Shotey ............... H01H 11/0006 174/53 |
| 8,882,536 | B2 * | 11/2014 | Utz ........................ H01R 43/26 439/536 |
| 9,198,259 | B2 | 11/2015 | Hoang |
| 9,685,783 | B2 | 6/2017 | Raneri |
| 9,965,007 | B2 | 5/2018 | Amelio |
| 10,222,768 | B2 | 3/2019 | Lancaster |
| 10,594,101 | B2 * | 3/2020 | Brower ................ H02J 7/0042 |
| 2008/0235943 | A1 * | 10/2008 | Gorman .................... H02G 3/14 29/854 |
| 2013/0335020 | A1 * | 12/2013 | Moore .................... H02J 50/90 320/109 |
| 2014/0093057 | A1 | 4/2014 | Hazani et al. |
| 2014/0368977 | A1 | 12/2014 | Lenny |
| 2015/0244121 | A1 * | 8/2015 | Amelio .................. H05B 47/10 439/345 |
| 2015/0256665 | A1 * | 9/2015 | Pera .................. H04M 1/72533 455/420 |
| 2016/0153674 | A1 * | 6/2016 | Lancaster ............... G05B 15/02 700/276 |
| 2016/0191268 | A1 | 6/2016 | Diebel |

\* cited by examiner

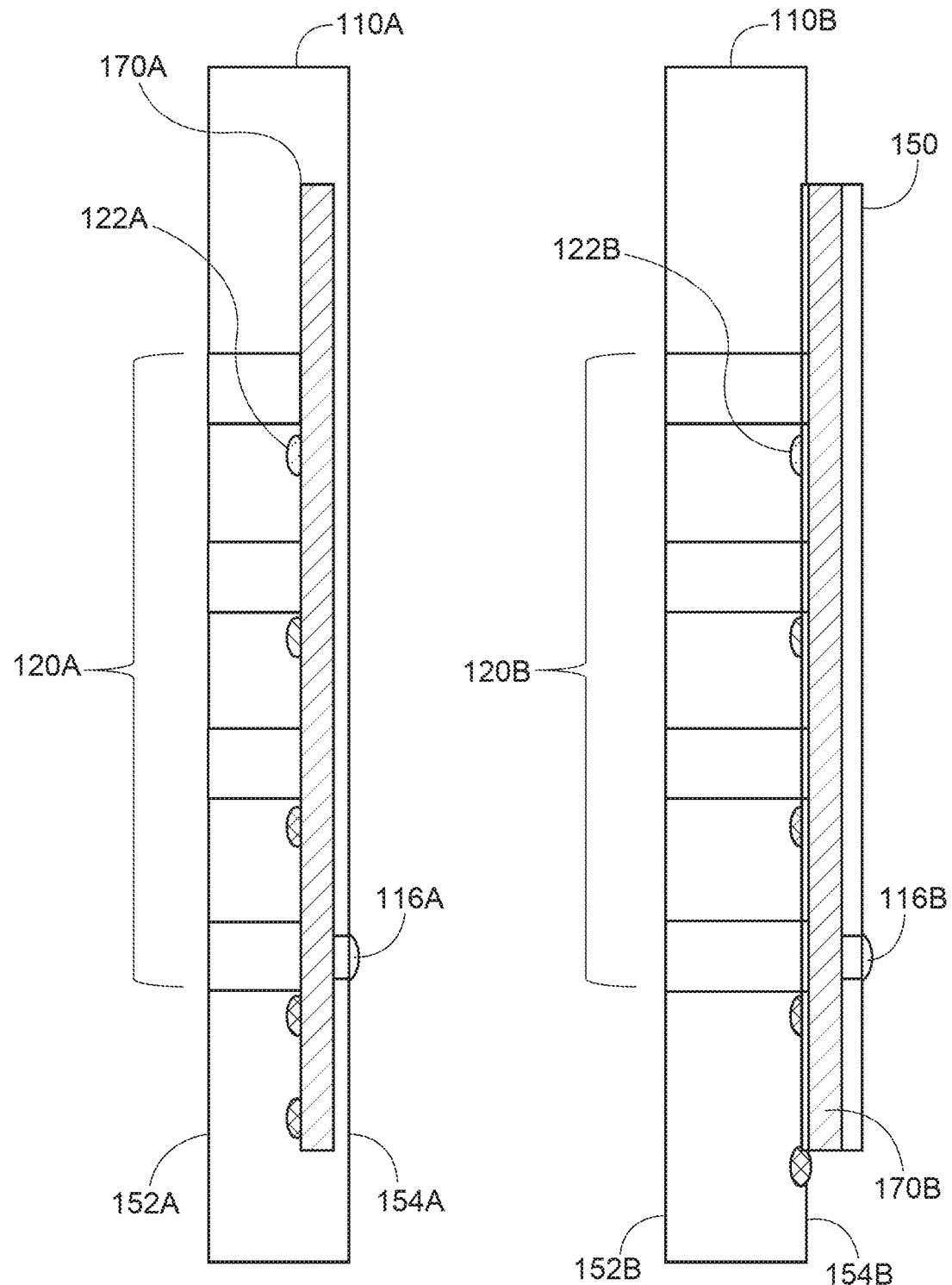

◎ Device Charged  ◯ Device Charging  ⊘ No Device (Port Ready)

ELECTRICAL OUTLET WITH INTERCHANGEABLE FACEPLATE MODULES

RELATED APPLICATION(S)

This application is a continuation of U.S. application Ser. No. 16/002,925, filed Jun. 7, 2018, which is based on U.S. Provisional Application Ser. No. 62/516,932, filed Jun. 8, 2017, the disclosure of which is incorporated herein by reference in its entirety and to which priority is claimed.

FIELD

Various exemplary embodiments of the invention relate to electrical outlets.

BACKGROUND

Electrical devices, specifically electrical receptacles capable of receiving electrical plugs, generally include two or three sets of blade apertures, with each set arranged to receive an electrical plug. The electrical receptacle or device is sold as a single unit or a multi-pack in home improvement stores and is then wired in by either a professional electrician or by the homeowner if he or she is comfortable with electrical wiring. For the average homeowner, replacing the electrical device can be expensive due to hiring an electrician or dangerous should they attempt the replacement themselves. Different outlet types are increasingly being used in homes, including USB outlets.

SUMMARY

According to an exemplary embodiment, an electrical outlet assembly includes a sub-faceplate having a front surface and first set of contacts position on the front surface. An outer faceplate includes an outer surface and an inner surface, the inner surface having a second set of contacts. The outer faceplate is releasably connected to the sub-faceplate so that the first set of contacts connect to the second set of contacts.

According to another exemplary embodiment, an electrical outlet assembly includes a sub-faceplate having a front surface and first set of contacts position on the front surface. The sub-faceplate is configured to connect to a receptacle opening. A first outer faceplate includes an outer surface and an inner surface, the inner surface having a second set of contacts, and the outer surface having a first configuration. A second outer faceplate includes an outer surface and an inner surface, the inner surface having a third set of contacts, and the outer surface having a second configuration different than the first configuration. The first outer faceplate and the second outer faceplate are selectively, releasably connectable to the sub-faceplate so that the first set of contacts connect to either the second or third set of contacts.

Another exemplary embodiment includes a method of providing a modular electrical outlet assembly. A sub-faceplate is provided having a front surface and first set of contacts position on the front surface, wherein the sub-faceplate is configured to connect to a receptacle opening. A plurality of outer faceplates are provided, each faceplate having an outer surface and an inner surface, the inner surface having a second set of contacts, and the outer surface having different configurations. The outer faceplates are selectively, releasably connectable to the sub-faceplate so that the first set of contacts connect to the second set of contacts.

BRIEF DESCRIPTION OF THE DRAWINGS

The aspects and features of various exemplary embodiments will be more apparent from the description of those exemplary embodiments taken with reference to the accompanying drawings, in which:

FIG. 1B is a side view of an outer faceplate;

FIG. 1C is a side view of another outer faceplate;

DETAILED DESCRIPTION OF EXEMPLARY EMBODIMENTS

Various exemplary embodiments relate to an electrical outlet having interchangeable faceplates. The faceplates can be interchanged without exposing a high voltage connection. The outlet can include a base or rear section that is configured to be recess mounted in a wall or other structural feature and a front section connected to the rear section. The front section can be connected to the rear section by a mechanical fastener, such as a screw or a snap fit connection. The front and rear sections may be permanently secured to one another with any suitable process, including but not limited to plastic or sonic welding, rivets, or adhesive. The rear section also includes the inner working of the electrical device, including but not limited to the electrical contacts, mounting structures, and any tamper resistant shutters. The rear section also includes mounting tabs or a mounting strap to mount the electrical device to an electrical box also well known in the art.

Figure 1A:
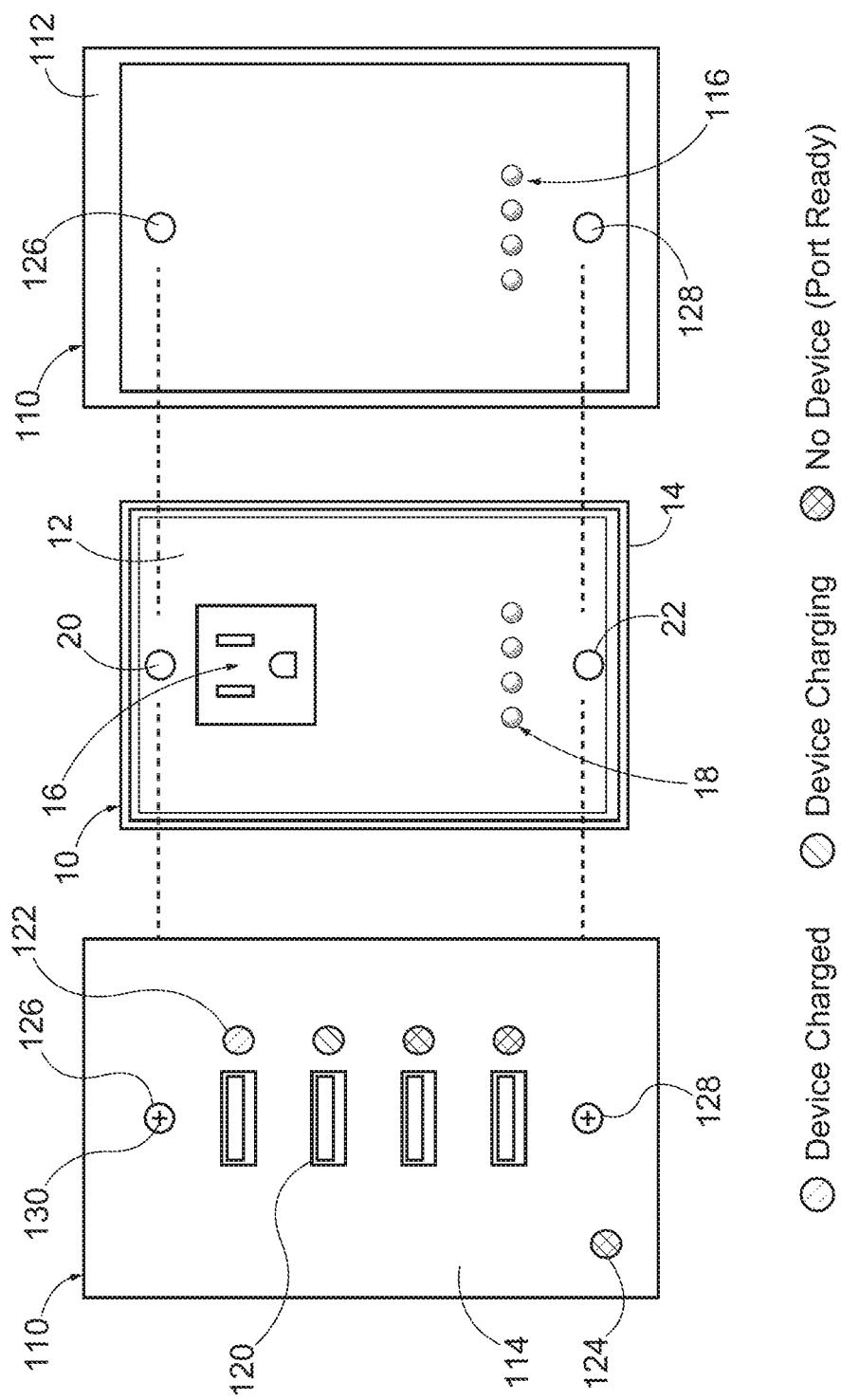
FIG. 1A is a front view of a sub-faceplate and a front and rear view of an outer faceplate.

FIG. 1A shows an exemplary embodiment of an outlet having a front section configured as a sub-faceplate 10. The sub-faceplate 10 includes an outer surface having a recessed portion 12 surrounded by an outer rim 14. A set of receptacle openings 16 are provided in an upper portion of the sub-faceplate 10. The receptacle openings 16 are in a standard three-prong configuration having hot, neutral, and ground openings. Other outlet opening configurations can be used including any residential, commercial, or industrial standard outlets. A first set of contacts 18 are positioned at a lower portion of the sub-faceplate 10. The contacts 18 can be spring contacts, pin contacts, or other suitable contacts. The contacts 18 can provide low voltage, AC, or DC power, and/or communication (Serial, UART, I2C, SPI) between the sub-faceplate 10 and the faceplate. The contacts 18 offer a low-voltage connection that is not dangerous to a user or requires a professional electrician for installation. The sub-faceplate 10 also includes one or more connecting features, illustrated here as an upper opening 20 and a lower opening 22 for receiving a fastener such as a screw.

As shown in FIG. 1A, the sub-faceplate 10 connects to an outer faceplate 110 that is positioned over and at least partially covers the sub-faceplate 10. The outer faceplate 110 has an inner portion 112 and an outer portion 114. The inner portion 112 includes a second set of contacts 116 positioned to align with, or otherwise electrically connect to, the first set of contacts 18 on the sub-faceplate 10.

The outer portion 114 includes one or more receptacle openings. The exemplary embodiment of FIG. 1A shows a set of four USB openings 120. An indicator light 122 is associated with each opening 120. The indicator lights can convey the status of the load connected to the openings, for example green meaning charged, red meaning charging, or blue meaning open or ready to charge. A faceplate indicator light 124 can be positioned separately from the opening indicator lights to show the status of the faceplate no. This can convey to a user that the outer faceplate no is properly connected to the sub-faceplate 10. The outer faceplate 110 also includes an upper opening 126 and a lower opening 128 for receiving a fastener such as a screw 130.

FIG. 1B shows the side view and interior design of an outer faceplate 110A with an outer surface 152A and an inner surface 154A. The outer surface 152A is in contact with an environment and the inner surface 154A is in electrical communication with the sub-faceplate 10 via a set of second contacts 116A positioned to align with, or otherwise electrically connect to, the first set of contacts 18 on the sub-faceplate 10. The outer faceplate 110A includes an internal assembly 170A, such as a printed circuit board (PCB), coupled to a set of four side view USB openings 120A on one side and the set of second contacts 116A on the other side. The internal assembly 170A governs the behavior, intelligence, and communication of outer faceplate 110A. The set of four side view USB openings 120A extend from the outer surface 152A to the internal assembly 170A. A side view indicator light 122A is associated with each USB opening 120A. Based on color, the side view indicator light 122A can convey the status of a load connected to the corresponding USB opening 120A.

FIG. 1C shows the side view and interior design of another outer faceplate 110B with an outer surface 152B and an inner surface 154B. The inner surface 154B is coupled to an extruded back 150 used to nest the outer faceplate 110B to the sub-faceplate 10. The extruded back 150 includes an internal assembly 170B coupled to the inner surface 154B on one side and a set of second contacts 116B on the other side. The internal assembly 170B governs the behavior, intelligence, and communication of outer faceplate 110B. Communication information and power between the outer faceplate 110B and the sub-faceplate 10 is transmitted via the set of second contacts 116B positioned to align with, or otherwise electrically connect to, the first set of contacts 18 on the sub-faceplate 10. A set of four side view USB openings 120B extend from the outer surface 152B to the inner surface 154B and are in electrical communication with the internal assembly 170B. A side view indicator light 122B is associated with each USB opening 120B. Based on color, the side view indicator light 122B can convey the status of a load connected to the corresponding USB opening 120B. The extruded back 150 in the illustrated embodiment provides added depth to the outer faceplate 110B to accommodate longer USB openings 120B.

Figure 2:
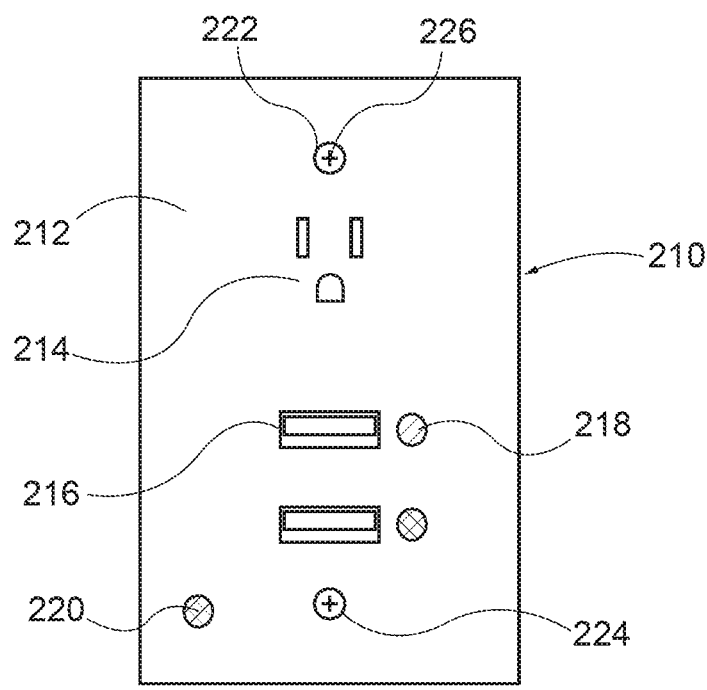
FIG. 2 is a front view of another outer faceplate.

FIG. 2 shows another exemplary embodiment of another outer faceplate 210. The outer faceplate 210 can have an inner portion with a set of contacts similar to the one shown in FIG. 1A. The outer portion 212 includes a 3-prong receptacle opening 214 and a pair of USB openings 216. Indicator lights 218 are respectively associated with each of the USB openings 216. A faceplate indicator light 220 can be positioned separately from the opening indicator lights 218 to show the status of the outer faceplate 210. The outer faceplate 210 also includes an upper opening 222 and a lower opening 224 for receiving a fastener 226 such as a screw.

Figure 3:
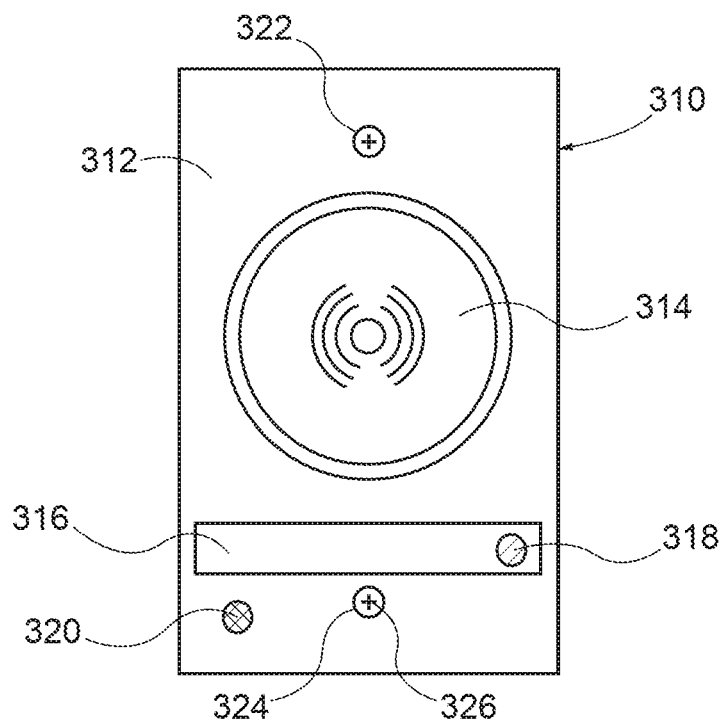
FIG. 3 is a front view of another outer faceplate.

FIG. 3 shows another exemplary embodiment of an outer faceplate 310. The outer faceplate 310 can have an inner portion with a set of contacts similar to the one shown in FIG. 1A. The outer portion 312 includes a wireless charger 314. A support or connecting feature 316 (illustrated here as a ledge or shelf) is positioned below the wireless charger 314 so that a device, such as a cell phone, can be supported and aligned with the wireless charger 314. The support 316 can be configured to contain a light unit that includes an LED light source that provides illumination in a desired direction. The wireless charger 314 can include one or more inductive coils that provide inductive power or charging to the supported device. A charger indicator light 318 can be associated with the wireless charger 310 to convey the status of the charger and/or the connected device. A faceplate indicator light 320 can be positioned separately from the charger indicator light 318 to show the status of the faceplate 310. The outer faceplate 310 also includes an upper opening 322 and a lower opening 324 for receiving a fastener 326 such as a screw.

Figure 4:
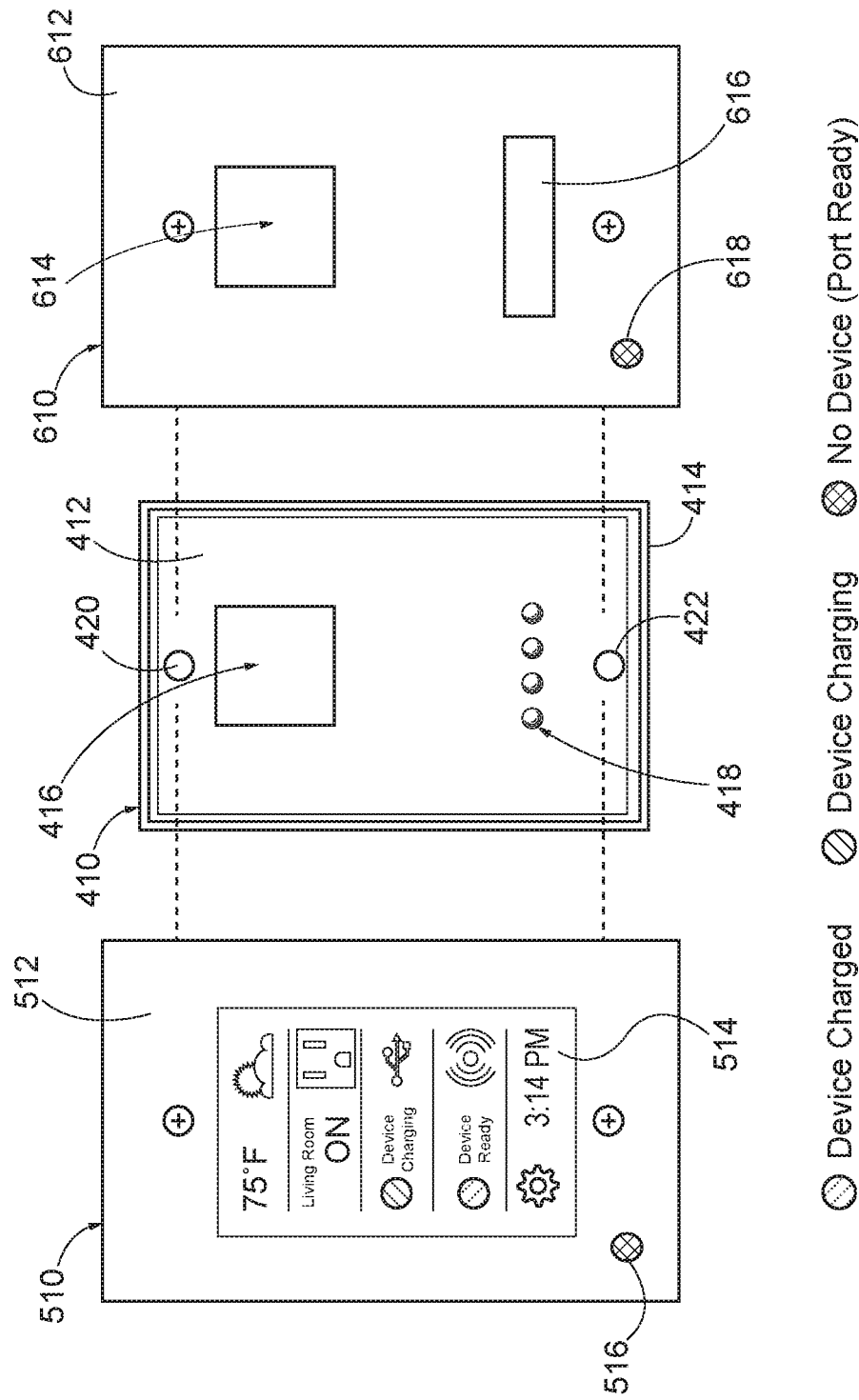
FIG. 4 is a front view of a sub-faceplate and a front view of a pair of outer faceplates.

FIG. 4 shows another exemplary embodiment of a sub-faceplate 410. The sub-faceplate 410 includes an outer surface having a recessed portion 412 surrounded by an outer rim 414. A switch 416 is positioned in an upper portion of the sub-faceplate 410. The switch 416 is illustrated as a two position (on/off) switch to control an electrical load and can use either a mechanical or capacitive mechanism. Other switches, for example a dimmer switch, can also be used. A first set of contacts 418 are positioned at a lower portion of the sub-faceplate 410. The contacts 418 can be spring contacts, pin contacts, or other suitable contacts. The sub-faceplate 410 also includes one or more connecting features, illustrated here as an upper opening 420 and a lower opening 422 for receiving a fastener such as a screw.

FIG. 4 also shows an exemplary embodiment of an outer faceplate 510. The outer faceplate 510 can have an inner portion with a set of contacts similar to the one shown in FIG. 1A. The outer portion 512 includes a display 514. The display 514 can be any type of screen (e.g. LCD, LED, OLED). Information is provided to the display 514, such as weather, time, charging status, and load status. The display 514 can be touch sensitive and allow a user to access different options or setting and to control one or more electrical loads in a given area such as a room or a house. A faceplate indicator light 516 can be positioned separately from the display 514 to show the status of the faceplate 510. The outer faceplate 510 also includes an upper opening and a lower opening for receiving a fastener such as a screw. In an exemplary embodiment, the faceplate 510 can communicate with other devices using WiFi, Bluetooth, Zigbee, or other lower energy communications or near field communications (NFC).

FIG. 4 also shows another exemplary embodiment of an outer faceplate 610. The outer faceplate 610 can have an inner portion with a set of contacts similar to the one shown in FIG. 1. The outer portion 612 includes an outer switch 614. The outer switch 614 aligns with the switch 416 on the sub-faceplate 410 and can include a mechanical or capacitive mechanism. A light unit 616 is positioned on the bottom portion of the switch. The light unit 616 can include an LED light that provides illumination in a desired direction or mark the borders of a pathway or room. A faceplate indicator light 618 can be positioned to show the status of the faceplate 610. The outer faceplate 610 also includes an upper opening and a lower opening for receiving a fastener such as a screw.

In using the components described above, one can provide a number of different outer faceplates having different configurations. A single type of sub-faceplate can be installed to a hard-wired connection and different outer faceplates can be installed and changed by a user as desired without exposing the user to a high-voltage connection.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. An electrical outlet assembly comprising:
   a sub-faceplate having a front surface and first set of contacts accessible on the front surface; and
   an outer faceplate having an outer surface and an inner surface, the inner surface having a second set of contacts,
   wherein the outer faceplate includes a circuit board electrically connected to the second set of contacts,
   wherein the outer faceplate is releasably connected to the sub-faceplate so that the first set of contacts connect to the second set of contacts, and
   wherein the first set of contacts and the second set of contacts are inaccessible to a user when the outer faceplate is connected to the sub-faceplate.

2. The electrical outlet assembly of claim 1, wherein the sub-faceplate includes a receptacle opening.

3. The electrical outlet assembly of claim 1, wherein the outer faceplate includes a 3-prong receptacle opening.

4. The electrical outlet assembly of claim 1, wherein the outer faceplate includes a USB receptacle opening.

5. The electrical outlet assembly of claim 1, wherein the outer faceplate includes a wireless charger.

6. The electrical outlet assembly of claim 1, wherein the outer faceplate includes a status indicator.

7. The electrical outlet assembly of claim 1, wherein the outer faceplate includes a display.

8. The electrical outlet assembly of claim 1, wherein the outer faceplate includes an outer switch and an indicator light and the sub-faceplate includes an inner switch configured to mate with the outer switch.

9. The electrical outlet assembly of claim 1, wherein the sub-faceplate includes recessed portion and an outer rim extending around the recessed portion and wherein a portion of the outer faceplate is nested in the recessed portion.

10. An electrical outlet assembly comprising:
    a sub-faceplate having a front surface and first set of contacts positioned on the front surface, wherein the sub-faceplate is configured to connect to a receptacle opening;
    a first outer faceplate having a first outer surface and a first inner surface, the first inner surface having a second set of contacts, and the first outer surface having a first configuration; and
    a second outer faceplate having a second outer surface and a second inner surface, the second inner surface having a third set of contacts, and the second outer surface having a second configuration different than the first configuration;
    wherein the first outer faceplate includes a circuit board electrically connected to the second set of contacts and the second outer faceplate includes a circuit board electrically connected to the third set of contacts,
    wherein the first outer faceplate and the second outer faceplate are selectively, releasably connectable to the sub-faceplate so that the first set of contacts connect to either the second or third set of contacts, and
    wherein the first set of contacts and the second set of contacts are inaccessible to a user when the first outer faceplate is connected to the sub-faceplate.

11. The electrical outlet assembly of claim 10, wherein the first set of contacts include pin contacts.

12. The electrical outlet assembly of claim 10, wherein one of the first configuration or the second configuration includes a USB receptacle opening.

13. The electrical outlet assembly of claim 10, wherein one of the first configuration or the second configuration includes a wireless charger.

14. The electrical outlet assembly of claim 10, wherein the first and second outer faceplates are connected to the sub-faceplate by a fastener.

15. The electrical outlet assembly of claim 10, wherein one of the first configuration or the second configuration includes a touchscreen display.

16. A method of providing a modular electrical outlet assembly comprising:
    providing a sub-faceplate having a front surface and first set of contacts positioned on the front surface, wherein the sub-faceplate is configured to connect to a receptacle opening; and
    providing a plurality of outer faceplates, each of the plurality of outer faceplates having an outer surface and an inner surface, the inner surface having a second set of contacts, and the outer surface having different configurations;
    wherein each of the plurality of outer faceplates includes a circuit board electrically connected to the second set of contacts,
    wherein the outer faceplates are selectively, releasably connectable to the sub-faceplate so that the first set of contacts connect to the second set of contacts,
    wherein the first set of contacts and the second set of contacts are inaccessible to a user when the outer faceplates are connected to the sub-faceplate, and
    wherein a first of the different configurations includes a USB receptacle opening and a second of the different configurations includes a prong receptacle opening.

17. The method of claim 16, wherein a user can connect the outer faceplates to the sub-faceplates without exposure to a high-voltage connection.

18. The method of claim 16, wherein a third of the different configurations includes a wireless charger.

* * * * *